No. 759,167. PATENTED MAY 3, 1904.
A. C. EASTWOOD.
FRICTION DRIVING MECHANISM.
APPLICATION FILED FEB. 27, 1904.

NO MODEL.

Witnesses:
Augustus B. Coppee
Wesley H. Ruel

Inventor:
Arthur C. Eastwood,
by his Attorneys,
Howson & Howson

No. 759,167. Patented May 3, 1904.

UNITED STATES PATENT OFFICE.

ARTHUR C. EASTWOOD, OF CLEVELAND, OHIO.

FRICTION DRIVING MECHANISM.

SPECIFICATION forming part of Letters Patent No. 759,167, dated May 3, 1904.

Application filed February 27, 1904. Serial No. 195,576. (No model.)

*To all whom it may concern:*

Be it known that I, ARTHUR C. EASTWOOD, a citizen of the United States, and a resident of Cleveland, Ohio, have invented certain Improvements in Friction Driving Mechanism for Motors, of which the following is a specification.

The object of my invention is to produce a friction driving mechanism in which—

First. The pressure of a friction-wheel upon the friction-disk will vary directly with the load to be driven, thus securing minimum strain and wear under conditions of light load and an increase of pressure with heavy loads. With such a combination of parts there is no slipping of one of the members relatively to the other, and consequently no injury to the friction-surface.

Second. The pressure of contact will be produced by the reaction of the armature of a motor on its field, thereby producing a perfectly definite pressure and one which is constant for a given load.

Third. The friction-roller will be automatically withdrawn from engagement with the friction-disk when the motor is out of action.

In present forms of friction driving mechanism the pressure between the roller and the disk is usually produced either by a spring or by some mechanical clamping device for holding the parts together. If the mechanism is set to transit power at all loads within its capacity, the parts are constantly subjected to maximum strain and wear. If, on the other hand, the pressure is adjusted for light loads and a heavy load is suddenly applied, there will be slipping between the parts and consequent unequal wearing of the friction-surfaces. Further, in the ordinary friction driving mechanism there is no provision for automatically withdrawing the friction-roller from the friction-disk when the device is out of action, and hence these parts remain under pressure indefinitely, with the result that the material of one or both of them becomes permanently set, there usually being a flat spot on the friction-roller and a depression in the face of the friction-disk.

My invention therefore consists in a novel arrangement of the parts of an electric or other motor and of the means employed for supporting the same, constructed with a view to overcoming the above-noted objections.

Figure 1:
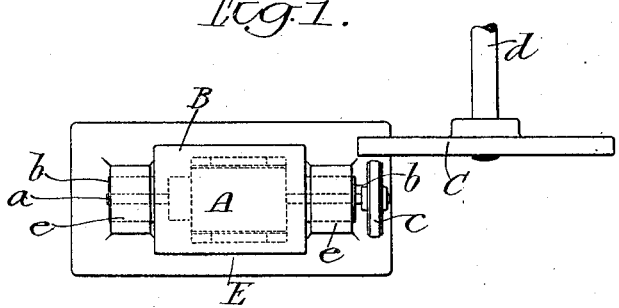
Figure 2:
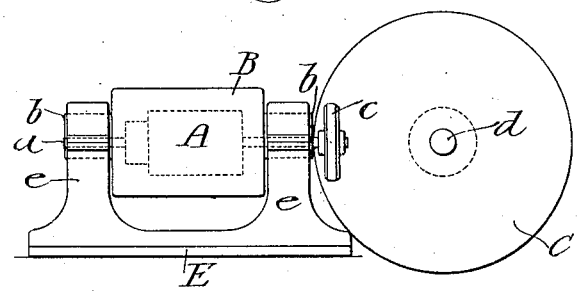
Figure 3:
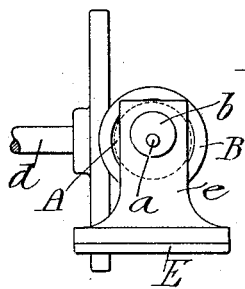

In the above drawings, Figure 1 is a plan view, to some extent diagrammatic, of my invention. Fig. 2 is a side elevation of the apparatus shown in Fig. 1, and Fig. 3 is an end elevation of the apparatus shown in Fig. 2.

In the above drawings, E is a supporting-framework having standards $e$, in which are bearings for the reception of the suitably-formed ends $b$ of a revoluble field-frame B. This field-frame is provided with the customary windings and is preferably cylindrical in form, there being within it an armature A, having a supporting-shaft $a$ journaled in bearings with the parts $b$ of the frame B. Said shaft is, however, eccentrically placed relatively to said bearings $b$, as indicated in Fig. 3, and carries on one end a friction-roller $c$, it being noted that while the frame B and its windings are symmetrically placed around the armature the axes of revolution of the armature and field-frame are different though parallel. Adjacent to said roller $c$ is a friction-disk C, carried upon a shaft $d$, and said disk is so placed relatively to the roller that the latter is out of engagement with the disk when the armature and field-frame are in the relative positions indicated in Fig. 3, in which the armature-shaft and the armature are shown in their lowermost position. This of course will be the normal position when the motor is out of action. If now current is supplied to the motor in such way that its armature tends to revolve, for example, in a clockwise direction, the field-frame, being also free to turn, will begin to revolve in the opposite direction. Such revolution will, however, in view of the eccentric position of the armature-shaft $a$ move this latter bodily so as to bring the friction-roller $d$ into engagement with the friction-disk C. It will be understood by those skilled in the art that the resulting pressure of contact will be proportional to the torque required to drive the disk C or to the reaction between the armature and the field. As soon as current is cut off from the motor the armature will turn the field-frame under the action of gravity into the position indicated in Fig. 3, with the friction-roller, as before, out of engagement with the friction-disk.

While I have described my invention as applied to an electric motor, it is to be understood that it may, if desired, be applied to any motor, and particularly to those having their reactive members free to rotate.

I claim as my invention—

1. The combination of a supporting structure, a field-frame having portions journaled in bearings on said structure, a shaft eccentrically supported in said portions of the field-frame, an armature and a roller on the shaft, and a friction-disk placed to be engaged by said roller, substantially as described.

2. The combination of a motor having two movable reactive parts, a wheel rotatable by one part and having means by which it may be moved bodily by the other part and mechanism operated by said wheel, substantially as described.

3. The combination of a motor having two rotary parts reactive upon one another and having different axes of revolution, a device revolved by one part, and having means whereby it is moved bodily by the other part, with a structure driven by said device, substantially as described.

4. An electric motor having both field-frame and armature free to revolve, said parts turning upon different axes, and mechanism driven by one of said parts, substantially as described.

5. An electric motor having a supporting-frame, a revoluble field-frame having bearings in said supporting-frame and an armature having a shaft journaled in the field-frame bearings in a line other than the center line thereof with mechanism driven by one of said parts, substantially as described.

6. The combination of a friction-disk, a roller having a supporting-shaft and bodily movable with said shaft, with a motor having two revoluble members, one of the same having means for rotating the shaft and the other having means for moving it bodily, substantially as described.

7. The combination of a friction-disk, a friction-roller placed to engage the same, with means for automatically forcing one of said parts toward the other with a pressure proportional to the power transmitted by said parts, substantially as described.

8. The combination of a friction-disk, a friction-roller placed to engage the same, with means for automatically forcing the roller toward the disk with a pressure proportional to the power transmitted through the said parts, substantially as described.

9. The combination of a revoluble field-frame having bearings, an armature supported eccentrically in said bearings, a driven device and means for transmitting power from one of the members of the motor to said device, substantially as described.

10. The combination of a motor having two parts revoluble on different axes, a roller operatively connected to one part, a disk placed to be engaged by the roller, the second part of the motor having means for bodily moving the first part of the motor, substantially as described.

11. The combination of an electric motor having a field and an armature both supported so as to be free to turn, the armature being supported eccentrically relatively to the supporting means of the field, a roller turned by the armature, and a driven structure placed to be engaged by the roller, substantially as described.

12. A friction driving mechanism including a disk, a shaft, a roller thereon placed to engage the disk, an armature on the shaft and a field-frame supported so as to be free to revolve eccentrically to the armature, substantially as described.

13. The combination of a friction-disk, a friction-roller, driving means connected to one of said parts and driven mechanism connected to the other with means for automatically forcing the roller and the disk together when the driving means is operated, substantially as described.

14. The combination of a friction-disk, a friction-roller normally out of active engagement with the same, driving and driven mechanism respectively connected to said two parts, said driving mechanism including means for automatically forcing the roller against the disk under operating conditions, substantially as described.

15. The combination in a friction driving mechanism of a disk, a roller, means for forcing one of said parts against the other and means for causing said parts to be automatically moved out of engagement when the driving means is out of action, substantially as described.

In testimony whereof I have signed my name to this specification in the presence of two subscribing witnesses.

ARTHUR C. EASTWOOD.

Witnesses:
WILLIAM E. BRADLEY,
JOS. H. KLEIN.